United States Patent
Pitney et al.

(10) Patent No.: US 11,436,636 B2
(45) Date of Patent: Sep. 6, 2022

(54) COMMUNICATING INFORMATION ABOUT PRODUCT OR SERVICE

(71) Applicant: Salesforce.com, Inc, San Francisco, CA (US)

(72) Inventors: Byron Pitney, Carmel, IN (US); Jeffrey S. Cunning, San Francisco, CA (US); Gabriel Joynt, Petaluma, CA (US); Adam Fletcher, Indianapolis, IN (US); Srikant Rao, Boston, MA (US)

(73) Assignee: salesforce.com, inc., San Francisco, CA (US)

( * ) Notice: Subject to any disclaimer, the term of this patent is extended or adjusted under 35 U.S.C. 154(b) by 1211 days.

(21) Appl. No.: 14/833,300

(22) Filed: Aug. 24, 2015

(65) Prior Publication Data

US 2016/0055528 A1    Feb. 25, 2016

Related U.S. Application Data

(60) Provisional application No. 62/040,934, filed on Aug. 22, 2014.

(51) Int. Cl.
*G06Q 30/02* (2012.01)

(52) U.S. Cl.
CPC .............................. *G06Q 30/0255* (2013.01)

(58) Field of Classification Search
CPC ............. G06Q 30/0255; G06Q 30/0207–0277
See application file for complete search history.

(56) References Cited

U.S. PATENT DOCUMENTS

| 8,099,318 | B2* | 1/2012 | Moukas | G06Q 30/0251 705/7.29 |
| 8,600,812 | B2* | 12/2013 | Zhang | G06Q 10/10 705/14.19 |
| 2009/0030774 | A1* | 1/2009 | Rothschild | G06Q 30/0277 705/14.1 |
| 2011/0041153 | A1* | 2/2011 | Simon | G06Q 30/02 725/46 |
| 2011/0288935 | A1* | 11/2011 | Elvekrog | G06Q 30/0241 705/14.53 |
| 2013/0282483 | A1* | 10/2013 | Ruarte | G06Q 30/0601 705/14.49 |

(Continued)

*Primary Examiner* — David J Stoltenberg
*Assistant Examiner* — Michael J Cross
(74) *Attorney, Agent, or Firm* — Butzel Long; Donald J. Lecher

(57) ABSTRACT

In a method for communicating information about a service or product, a record can be retrieved from a database storing records of communications related to a second entity. The record can include information related to an identity of a first entity. The first entity can be defined, at a processor and based upon content of the record, as a member of a set designated to be sent the information about the product or service. The first entity can have previously engaged in a first communication related to the second entity. The second entity can be associated with the product or service. A second communication, which can include the information related to the identity of the first identity, can be sent from the processor to an advertising platform. A third communication, which can include the information about the product or service, can be sent from the processor to the advertising platform.

19 Claims, 15 Drawing Sheets

(56) References Cited

U.S. PATENT DOCUMENTS

| | | | |
|---|---|---|---|
| 2013/0325605 A1* | 12/2013 | Callaghan | G06Q 30/02 705/14.53 |
| 2014/0172504 A1* | 6/2014 | Duva | G06Q 30/0242 705/7.31 |
| 2014/0249921 A1* | 9/2014 | Nicklin | G06Q 30/0255 705/14.53 |
| 2015/0348090 A1* | 12/2015 | Alsina | G06Q 30/0255 705/14.43 |
| 2016/0027048 A1* | 1/2016 | Ma | G06Q 30/0254 705/14.52 |
| 2016/0189210 A1* | 6/2016 | Lacey | G06N 7/005 705/7.31 |

* cited by examiner

202 — Define a first entity as a member of a set designated to be sent the information about the product or the service

↓

204 — Send, to an advertising platform, a communication with information related to an identity of the first entity

↓

206 — Send, to the advertising platform, a communication with the information about the product or the service

1500

COMMUNICATING INFORMATION ABOUT PRODUCT OR SERVICE

CROSS-REFERENCE TO RELATED APPLICATIONS

This application claims, under 35 U.S.C. § 119(e), the benefit of U.S. Provisional Application No. 62/040,934, filed Aug. 22, 2014, the disclosure of which is incorporated by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

BACKGROUND

Marketing promotion includes a variety of approaches to communicating information about a product or a service to potential customers for the purpose of selling the product or the service. These approaches can include such activities as advertising, personal selling, sales promotion, product placement, public relations, publicity, corporate image campaigns, event sponsorship, and direct marketing. In direct marketing, information about the product or the service is communicated directly to a discrete potential customer rather than to the general public. The communication can occur via any of an assortment of forms including promotional letters, fliers, catalogs, telephone calls, interactive consumer websites, online advertisements, e-mail, text messaging, and social networks. Because in direct marketing the communication is directly to a discrete potential customer rather than to the general public, it is desirable to have data about the discrete potential customer that is indicative that the discrete potential customer is more likely than the general public to be positively receptive of the information about the product or the service.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementation of the disclosed subject matter. No attempt is made to show structural details in more detail than may be necessary for a fundamental understanding of the disclosed subject matter and the various ways in which it can be practiced.

FIG. 2 is a flow diagram illustrating an example of a method for communicating information about a product or a service.

DETAILED DESCRIPTION

Figure 1:
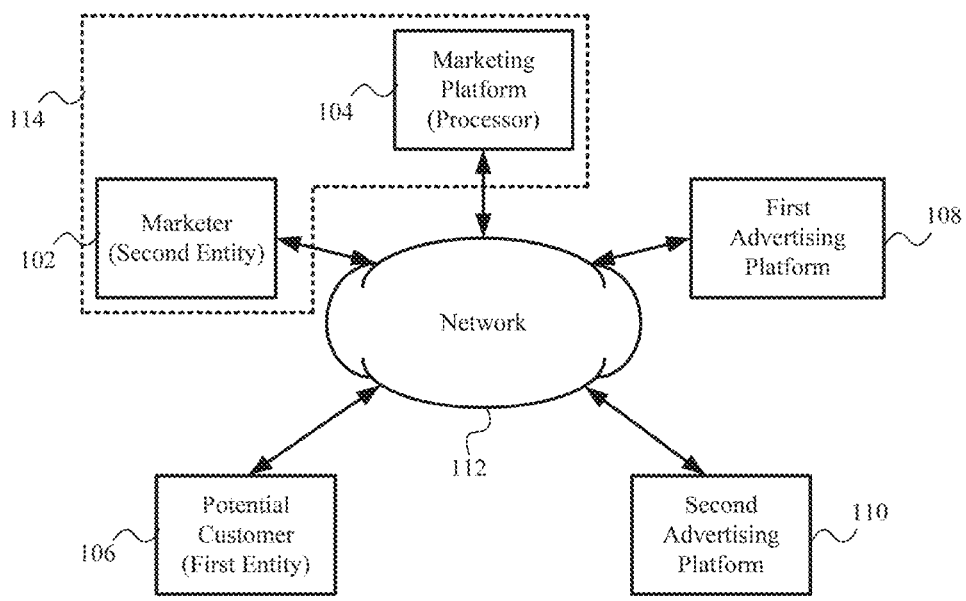
FIG. 1 is a diagram illustrating an example of an environment in which the information about the product or the service can be communicated.

The last two decades have witnessed extraordinary advancements in communication systems. Among these improvements have been the development of mobile telephones, the growth of the Internet, and the recognition of protocols to support the World Wide Web, e-mail, and text messaging. Most recently, the establishment of social networking services has provided yet another channel through which communications can occur. The expanding options of different communication systems has increased the number of possibilities through which information about a product or a service can be communicated for direct marketing to a discrete potential customer. However, because each of these communication systems typically is associated with a particular communication service provider and each of these communication service providers normally uses a unique address to identify an entity (e.g., the discrete potential customer) having an account with the communication service provider, this situation gives rise to the specific problem, rooted in this expansion of options of different communication systems, of gaining communicative access to a specific entity via the various communication service providers with which the specific entity has accounts.

Implementations disclosed herein relate generally to communicating information, and relate particularly to communicating information about a product or a service. On the one hand, the expansion of options of different electronic communications systems can increase the number of channels through which communications to a first entity (e.g., a potential customer) can be sent from a second entity (e.g., a marketer). On the other hand, this expansion of options can cause a reduction in the ability of the second entity to communicate with the first entity in a situation in which the first entity has come to favor a first channel of electronic communications over a second, but the second entity does not have the address to identify the first entity having an account associated with the first channel of communications. In both of these situations, the second entity (e.g., the marketer) can cause an electronic communication to be sent to a communications service provider. For example, the communications service provider can be an automated, computer-implemented advertising platform. On behalf of the second entity, this communication can be sent to the communications service provider by an intermediary entity (e.g., an automated, computer-implemented marketing platform). This communication can include information related to an identity of the first entity (e.g., an e-mail address). The communications service provider can determine if the first entity has an account with the communications service provider. In an aspect, the communications service provider can send a communication that confirms that the first entity has an account with the communications service provider. A communication that includes the information about the product or the service can be sent to the communications service provider. The communications service provider can present the information about the product or the service at a time when the first entity is logged into the account that the first entity has with the communications service provider.

FIG. 1 is a diagram illustrating an example of an environment 100 in which the information about the product or the service can be communicated. The environment 100 can include several elements such as, for example, a marketer 102, a marketing platform, 104, a potential customer 106, a first advertising platform 108, and a second advertising platform 110. In an implementation, an element of the environment 100 can be communicatively connected to one or more other elements via a network 112. In general, each of the platforms 104, 108, 110 is a computer-implemented platform configured to automatically perform some or all of the functions disclosed herein. Various information described herein may be stored in one or more databases accessible to, or integral with, the platform, for example as described with respect to FIG. 12.

The marketer 102 can be, for example, an entity that intends to communicate information about the product or the service. The marketer 102 can maintain information about customers and potential customers in a customer relationship management (CRM) system (not illustrated).

The marketing platform 104 can be, for example, a combination of hardware architecture, operating system, runtime libraries, and/or computer software or code object to support one or more marketing applications. In an implementation, the CRM system of the marketer 102 and the marketing platform 104 can be resources in a cloud computing environment such that the CRM system of the marketer 102 can be communicatively connected to the marketing platform 104 via the network 112. The cloud computing environment can be a distributed computer network in which a hardware resource for storing data, a hardware resource for storing one or more computer programs, a hardware resource for executing computer programs, a hardware resource for allowing a user to initiate execution of a computer program, and a hardware resource for receiving an output from a computer program are dispersed throughout a network, but arranged to be configured to operate together as needed to execute a computer program. For example, the marketing platform 104 can be a cloud marketing platform operated by salesforce.com of San Francisco, Calif. Alternatively, the CRM system of the marketer 102 and the marketing platform 104 can be combined in a platform 114.

The potential customer 106 can be, for example, an individual or an organization. The potential customer 106 can use a communication device (not illustrated) to communicate with one or more other elements of the environment 100. By way of example and not by way of limitation, the communication device can be any suitable electronic communication device, such as a smartphone, a cellular phone, a personal digital assistant (PDA), a wireless modem, a wireless communication device, a handheld device, a desktop computer, a laptop computer, a netbook, a tablet computer, a web portal, an enterprise portal, an intranet portal, a captive portal, a telephone, a cordless phone, a wireless local loop (WLL) station, etc.

One or more of the first and the second advertising platforms 108 and 110 can be, for example, a combination of hardware architecture, operating system, runtime libraries, and/or computer software or code object to support presentation of information about products or services from marketers. For example, the first and the second advertising platforms 108 and 110 can be configured to provide web pages in which advertisements for the products or services of the marketers are presented to potential customers. Providers of the first and the second advertising platforms 108 and 110 can include, by way of example and not by way of limitation, Microsoft Corporation of Redmond, Wash.; Yahoo Inc. of Sunnyvale, Calif.; Facebook, Inc. of Menlo Park, Calif.; Twitter, Inc. of San Francisco, Calif.; or LinkedIn Corporation LAD of Mountain View, Calif.

The network 112 can be, for example, a telecommunications network configured to allow computers to exchange data. Connections between elements of the environment 100 via the network 112 can be established using cable media, wireless media, or both. Data traffic on the network 112 can be organized according to a variety of communications protocols including, but not limited to, the Internet Protocol Suite (Transmission Control Protocol/Internet Protocol (TCP/IP)), the Institute of Electrical and Electronics Engineers (IEEE) 802 protocol suite, the synchronous optical networking (SONET) protocol, the Asynchronous Transfer Mode (ATM) switching technique, or any combination thereof. In an implementation, the network 112 can include the Internet.

FIG. 2 is a flow diagram illustrating an example of a method 200 for communicating information about a product or a service. In the method 200, at an operation 202, a first entity can be defined, at a processor, as a member of a set. The set can be designated to be sent information about the product or the service. The first entity can have previously engaged in a communication related to a second entity. The second entity can be associated with the product or the service.

The first entity can be, for example, a potential customer (e.g., the potential customer 106). The processor can be, for example, a processor of a marketing platform (e.g., the marketing platform 104). The second entity can be, for example, a marketer (e.g., the marketer 102). The communication related to the second entity, in which the first entity had previously engaged, can have been, by way of example and not by way of limitation, via a postal service, a telephone system (e.g., voice, voicemail, facsimile, cellular, satellite, etc.), an e-mail system, a web page (e.g., an enterprise portal, a web page of a social networking service, etc.), a text messaging system (e.g., a Short Messaging Service (SMS) system, a Multimedia Messaging Service (MMS) system, a social networking service text messaging system, etc.), the like, or any combination thereof.

The set can be defined, for example, from a population of customers and/or potential customers maintained in a CRM system of the marketer. For example, the set can be defined to include members of the population of customers and/or potential customers that are more likely than other members of the population to be positively receptive to the information about the product or the service. Additionally or alternatively, the set can be defined to include members of the population of customers and/or potential customers that are within a market segment defined by the marketer. Additionally or alternatively, the set can be defined by determining that the set includes portions of customers and/or potential customers of the second entity that have a value to the second entity that is greater than a threshold. For example the value of each of the customers and/or potential customers in a CRM system of the second entity can be determined. The set can be defined to include those customers and/or potential customers whose value to the second entity is greater than a threshold dollar amount. Alternatively, the set can be defined to include those customers and/or potential customers whose value to the second entity is greater than a threshold percentile of all of the customers and/or potential customers.

At an operation 204, a communication can be sent from the processor to an advertising platform. This communication can include information related to an identity of the first entity. The advertising platform can be, for example, the first or the second advertising platform 108 or 110. In an implementation, the first entity can have one or more accounts with the advertising platform. The information related to the identity of the first entity can include, for example, an e-mail address, a username, at least a portion of a name, an alias, at least a portion of a government identification number, at least a portion of an employee identification number, at least a portion of a mailing address, at least a portion of a telephone number, at least a portion of a facsimile number, the like, or any combination thereof. In an implementation, the information related to the identity of the first entity can be encrypted. For example, an encrypted form of the information related to the identity of the first entity can be produced from a hash function.

At an operation 206, a communication can be sent from the processor to the advertising platform. This communication can include the information about the product or the service. The information about the product or the service can be, for example, an advertisement, a promotion, general information, the like, or any combination thereof.

The advertising platform can present the information about the product or the service. In an implementation, the advertising platform can provide one or more web pages on which the information about the product or the service can be displayed. In an implementation, if the first entity has one or more accounts with the advertising platform, then the advertising platform can present the information about the product or the service at a time when the first entity is logged into the one or more accounts. In this manner, the marketer, via the second entity (e.g., the marketing platform) and the advertising platform, can communicate the information about the product of the service directly to the first entity rather than to the general public.

In an implementation, the communication of the operation 204 and the communication of the operation 206 can be sent concurrently. For example, in response to receipt, at the advertising platform, of the communications of the operations 204 and 206, the advertising platform can store the information about the product or the service (from the communication of the operation 206) in a memory and can use the information related to the identity of the first entity (from the communication of the operation 204) to determine if the first entity has one or more accounts with the advertising platform. In response to a determination that the first entity does have one or more accounts with the advertising platform, the advertising platform can retrieve the information about the product or the service from the memory and can present the information about the product or the service at a time when the first entity is logged into the one or more accounts.

Alternatively, a communication, which includes information that confirms that the first entity has an account with the advertising platform, can be received at the processor (e.g., the marketing platform).

Figure 3:
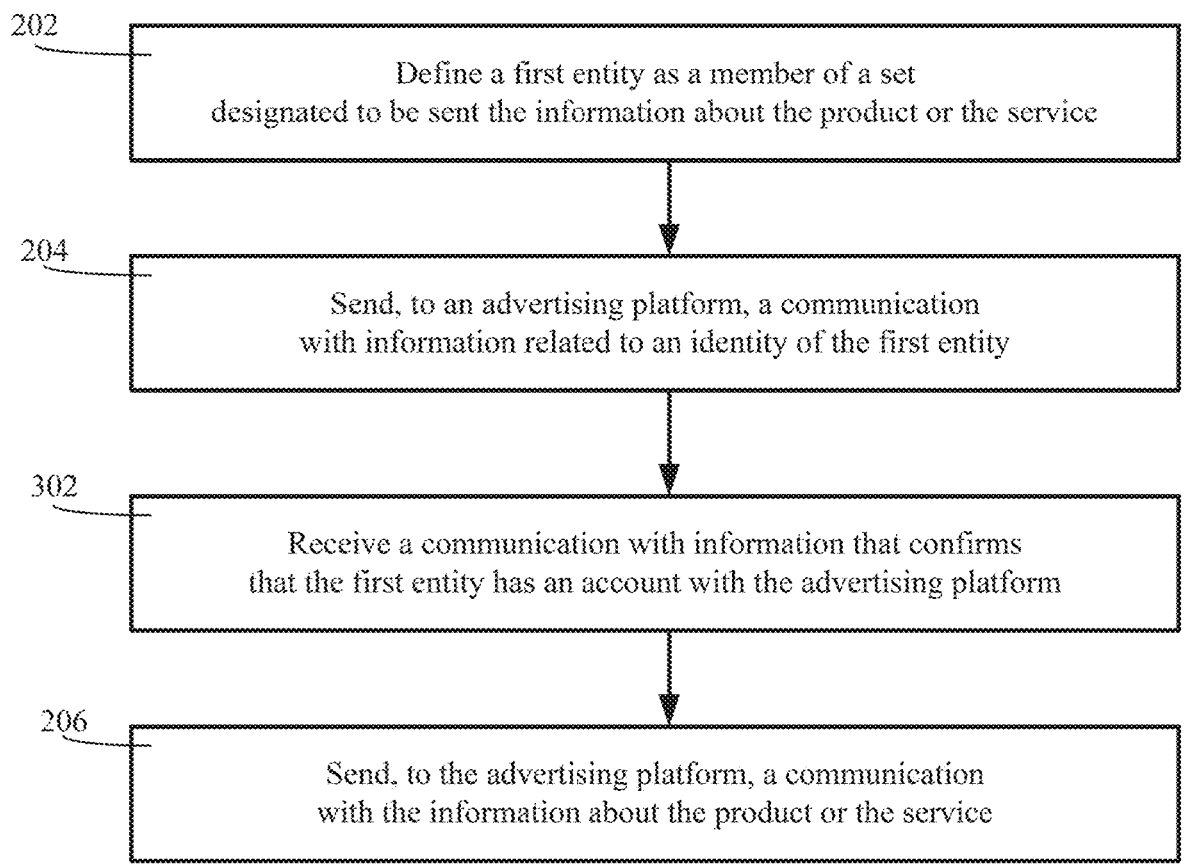
FIG. 3 is a flow diagram illustrating another example of a method for communicating information about a product or a service in which a confirmation communication can be received.

FIG. 3 is a flow diagram illustrating an example of a method 300 for communicating information about a product or a service in which a confirmation communication can be received. In the method 300, at the operation 202, the first entity (e.g., the potential customer) can be defined, at the processor, as a member of the set. The set can be designated to be sent the information about the product or the service as previously described. The first entity can have previously engaged in a communication related to the second entity (e.g., the marketer). The second entity can be associated with the product or the service. For example, the potential customer can have previously requested information about a particular product or service from the marketer. At the operation 204, a communication can be sent from the processor to the advertising platform. This communication can include the information related to the identity of the first entity. At an operation 302, a communication can be received at the processor. This communication can include information that confirms that the first entity has an account with the advertising platform. For example, in response to receipt, at the advertising platform, of the communication that includes the information related to the identity of the first entity, the advertising platform can send, to the processor, the communication that includes the information that confirms that the first entity has an account with the advertising platform. At the operation 206, a communication can be sent from the processor to the advertising platform. This communication can include the information about the product or the service. For example, in response to receipt, at the processor, of the communication that includes the information that confirms that the first entity has an account with the advertising platform, the processor can send, to the advertising platform, the information about the product or the service.

In an implementation, the advertising platform can be a social networking service provider. The social networking service provider can be, by way of example and not by way of limitation, Facebook, Inc. of Menlo Park, Calif.; Twitter, Inc. of San Francisco, Calif.; or LinkedIn Corporation LAD of Mountain View, Calif. In this implementation, a communication, which includes an invitation to establish continual communications between an account for the first entity provided by the social networking service provider and an account for the second entity provided by the social networking service provider, can be sent from the processor (e.g., the marketing platform).

Figure 4:
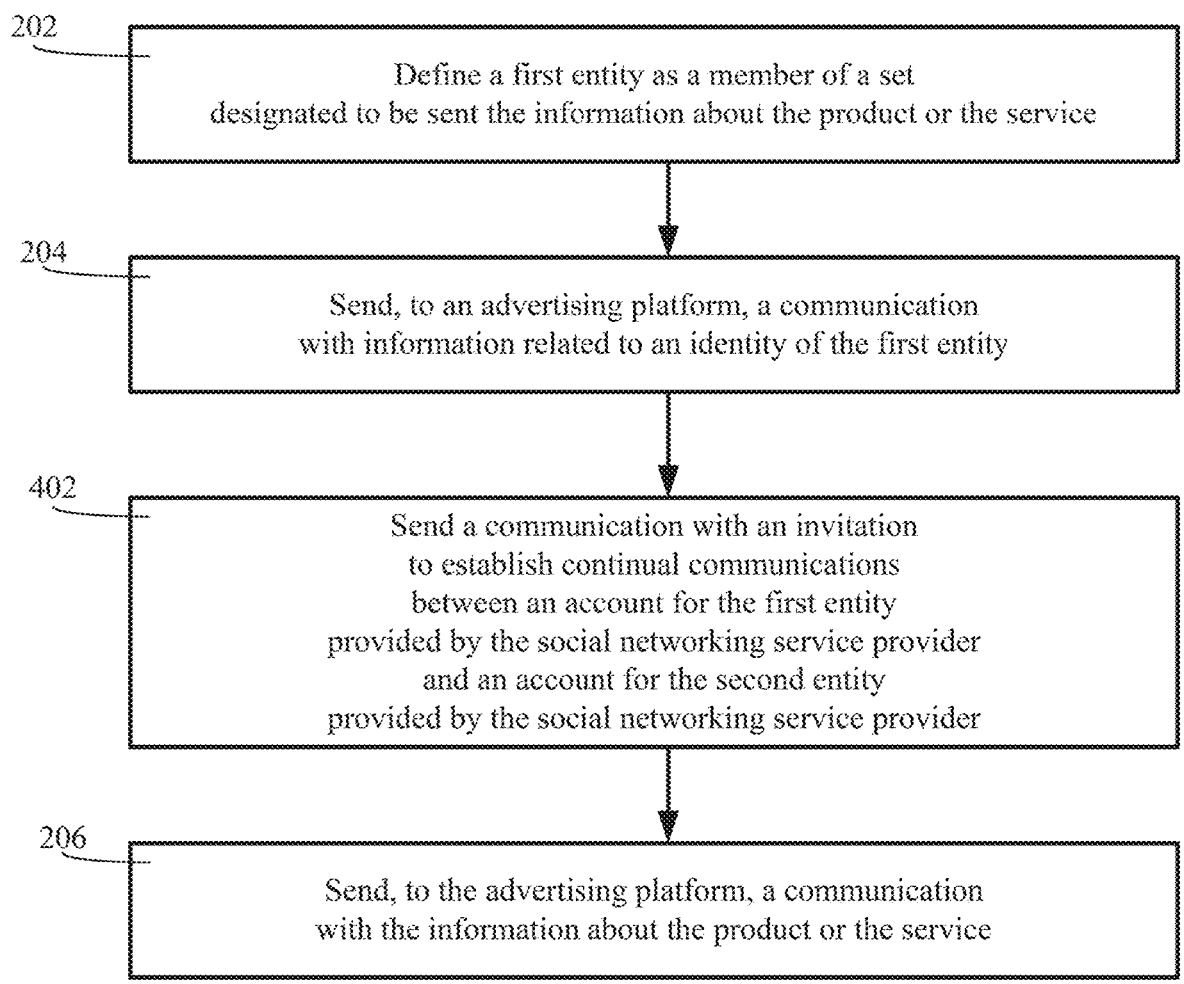
FIG. 4 is a flow diagram illustrating yet another example of a method for communicating information about a product or a service in which an invitation communication can be sent.

FIG. 4 is a flow diagram illustrating an example of a method 400 for communicating information about a product or a service in which an invitation communication can be sent. In the method 400, at the operation 202, the first entity (e.g., the potential customer) can be defined, at the processor, as a member of the set. The set can be designated to be sent the information about the product or the service. The first entity can have previously engaged in a communication related to the second entity (e.g., the marketer). The second entity can be associated with the product or the service. At the operation 204, a communication can be sent from the processor to the advertising platform. This communication can include the information related to the identity of the first entity. At an operation 402, a communication can be sent from the processor. This communication can include an invitation to establish continual communications between an account for the first entity provided by the social networking service provider and an account for the second entity provided by the social networking service provider. For example, this communication can be sent to the first entity via the account for the first entity provided by the social networking service provider. For example, this communication can include an invitation to the first entity to "friend" the second entity on Facebook® or to "follow" the second entity on Twitter®. At the operation 206, a communication can be sent from the processor to the advertising platform. This communication can include the information about the product or the service. In an implementation, the communication of the operation 204 and the communication of the operation 302 can be sent concurrently. Additionally or alternatively, the communication of the operation 206 and the communication of the operation 302 can be sent concurrently.

In an implementation, the communication related to the second entity (e.g., the marketer), in which the first entity (e.g., the potential customer) had previously engaged prior to defining the first entity as a member of a set at the operation 202, can have been sent from the first entity to the second entity for a reason other than in response to a communication from the second entity to the first entity. For example, in a history of exchanges of communications between the first entity and the second entity, this communication can have been initiated by the first entity. For example, the first entity can have sent an e-mail message to the second entity with: (1) a request for information about the product or the service, (2) a request for information about a similar or complementary product or service, (3) a request for information about the second entity, (4) information to register the product with the second entity, (5) information related to a replacement part for the product, (6) information related to a warranty for the product or the service, or (7) the like. Such a communication can be indicative that the first entity is likely to be positively receptive to the information about the product or the service sent at the operation 206. For example, if the first entity had previously sent an e-mail message to the second entity in which the e-mail message stated a positive experience that the first entity had enjoyed with a particular product provided by the second entity, such a communication can be indicative that the first entity is likely to be positively receptive to information about the particular product or about a complementary product.

In an implementation, the communication related to the second entity (e.g., the marketer), in which the first entity (e.g., the potential customer) had previously engaged prior to defining the first entity as a member of a set at the operation 202, can be between the first entity and the second entity. In this implementation, to define the first entity as the member of the set designated to be sent the information about the product or the service (i.e., the operation 202), this communication can be analyzed to determine a pattern of behavior of the first entity. The pattern of behavior can be indicative of a degree of receptiveness of the first entity to the information about the product or the service. For example, this communication can be a plurality of communications between the first entity and the second entity. Such communications can be tracked and analyzed to determine the pattern of behavior. For example, such communications can be tracked and analyzed by a marketing platform such as Journey Builder® provided by salesforce.com of San Francisco, Calif.

By way of example and not by way of limitation, an analysis of such communications can suggest a pattern in which the first entity has reduced the number of communications via an account that the first entity has with a first advertising platform (e.g., the first advertising platform 108), but has increased the number of communications via an account that the first entity has with a second advertising platform (e.g., the second advertising platform 110). By way of example and not by way of limitation, an analysis of such communications can suggest a pattern in which the first entity typically responds to a communication to a first account (e.g., an e-mail message) within two weeks, but typically responds to a communication to a second account (e.g., a text message) within one day. Such analyses can be performed in an automatic, computer-implemented manner using a marketing platform such as Journey Builder®. Using such a marketing platform, the second entity can develop a plan, for example: (1) to send a first communication with the information about the product or the service to the first account (e.g., the e-mail account) of the first entity, (2) to allow the first entity a predetermined duration of time (e.g., 30 days) to respond to the first communication, and (3) to second a second communication with the information about the product or the service to the second account (e.g., the telephone number) of the first entity if the first entity failed to respond to the first communication within the predetermined duration of time. Such a plan can be implemented in an automatic, computer-implemented manner using a marketing platform such as Journey Builder®.

In an implementation, the communication related to the second entity (e.g., the marketer), in which the first entity (e.g., the potential customer) had previously engaged prior to defining the first entity as a member of a set at the operation 202, can be different from a communication between the first entity and the second entity, but this communication can be about the product or the service, a brand associated with the product or the service, the second entity, the like, or any combination thereof. For example, this communication can be a Tweet® posted via Twitter®. The Tweet® communication may not be between the first entity and the second entity, but the Tweet® communication can be about the product or the service, a brand associated with the product or the service, the second entity, the like, or any combination thereof. For example, this communication can be one of several communications. Such communications can be about the product or the service, a brand associated with the product or the service, the second entity, the like, or any combination thereof. Such communications can be tracked to determine if the first entity is a participant. For example, such communications can be tracked by a social media monitoring platform such as Radian6® provided by salesforce.com of San Francisco, Calif.

Figure 5:
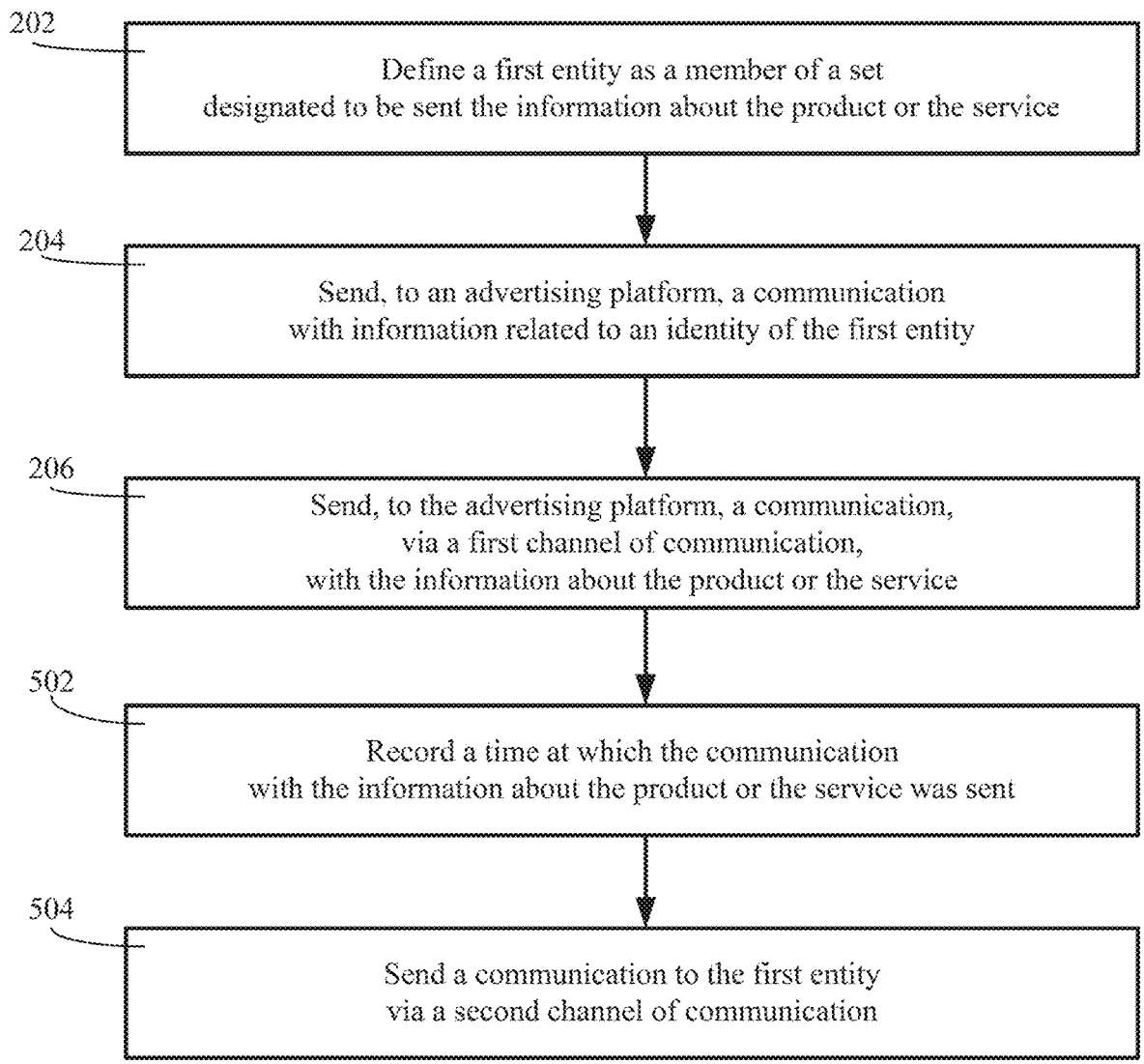
FIG. 5 is a flow diagram illustrating still another example of a method for communicating information about a product or a service in which a communication via a second channel of communication can be sent.

In an implementation, the communication related to the second entity (e.g., the marketer), in which the first entity (e.g., the potential customer) had previously engaged prior to defining the first entity as a member of a set at the operation 202, can include the information related to the identity of the first entity. FIG. 5 is a flow diagram illustrating an example of a method 500 for communicating information about a product or a service in which a communication via a second channel of communication can be sent. In the method 500, at the operation 202, the first entity (e.g., the potential customer) can be defined, at the processor, as a member of the set. The set can be designated to be sent the information about the product or the service. The first entity can have previously engaged in a communication related to the second entity (e.g., the marketer). The second entity can be associated with the product or the service. At the operation 204, a communication can be sent from the processor to the advertising platform. This communication can include the information related to the identity of the first entity. At the operation 206, a communication can be sent from the processor to the advertising platform. This communication can include the information about the product or the service. This communication can be via a first channel of communication. For example, this communication can be presented when the first entity is logged into a first account that the first entity has with the advertising platform (e.g., username@email.com). Alternatively, this communication can be presented when the first entity is logged into an account that the first entity has with a first advertising platform (e.g., email.com). At an operation 502, a time at which the communication of the operation 206 was sent from the processor can be recorded. At an operation 504, a communication can be sent from the processor to the first entity. This communication can be via a second channel of communication. For example, this communication can be presented when the first entity is logged into a second account that the first entity has with the advertising platform (e.g., alias@email.com). Alternatively, this communication can be presented when the first entity is logged into an account that the first entity has with a second advertising platform (e.g., Facebook® or Twitter®).

In this implementation, at the operation 202, the set can be defined by determining that, since the recorded time of the operation 502, the first entity has been unresponsive to the communication of the operation 206, and that a present time is later than a sum of a predetermined duration of time added to the recorded time. For example, if the communication of the operation 206 was sent to the first entity on Jan. 1, 2015, to be presented when the first entity is logged into an account that the first entity has with email.com, the predetermined duration of time is 30 days, the first entity has been unresponsive to the communication of the operation 206, and the present time is Feb. 1, 2015, then the first entity can be defined as a member of the set and the communication of the operation 504 can be sent to be presented when the first entity is logged into an account that the first entity has with Facebook® or Twitter®.

In an implementation, the communication related to the second entity (e.g., the marketer), in which the first entity (e.g., the potential customer) had previously engaged prior to defining the first entity as a member of a set at the operation 202, can include the information related to the identity of the first entity. In this implementation, this communication can also include information that indicates that the first entity has executed an agreement to engage in electronic communication with the second entity, electronic commerce with the second entity, or both. Through such a communication the first entity can become a subscriber to the second entity.

Figure 6:
FIG. 6 is a diagram illustrating an example of a web page for sending a communication to become a subscriber.

FIG. 6 is a diagram illustrating an example of a web page 600 for sending a communication to become a subscriber. The web page 600 can be provided by a marketer (e.g., the second entity). The web page 600 can include, for example, a text terminal window 602, a first display window 604, a second display window 606, a third display window 608, a check box 610, and a button 612. The text terminal window 602 can be configured to allow a potential customer (e.g., the first entity) to enter personal information. By way of example and not by way of limitation, the personal information can include a name, a mailing address, a telephone number, a fax number, and an e-mail address. The personal information can include the information related to the identity of the first entity (i.e., the information sent from the processor (e.g., the marketing platform 104) to the advertising platform in the operation 204). The first display window 604 can be configured to display information to entice the potential customer to execute an agreement to engage in electronic communication with the marketer. For example, the first display window 604 can include text that forms the question, "Would you like to receive e-mail messages from ABC Corporation?" The check box 610 can be configured to allow the potential customer to execute the agreement to engage in electronic communication with the marketer. One of skill in the art understands that another graphical control element rather than the check box 610 can be used to allow the potential customer to execute the agreement to engage in electronic communication with the marketer. The second display window 606 can be configured to display information about a product or a service to be purchased by the potential customer. For example, the second display window 606 can include text that forms the phrase, "Your purchases:" and text that states an identity and a quantity of each purchase (e.g., "Product X (1)"). The third display window 608 can be configured to display information to direct the potential customer how to execute an agreement to engage in electronic commerce with the marketer (e.g., how to complete the purchase). For example, the third display window 608 can include text that forms the phrase, "Place your order:" The button 612 can be configured to allow the potential customer to execute the agreement to engage in electronic commerce with the marketer. One of skill in the art understands that another graphical control element rather than the button 612 can be used to allow the potential customer to execute the agreement to engage in electronic commerce with the marketer.

Figure 7:
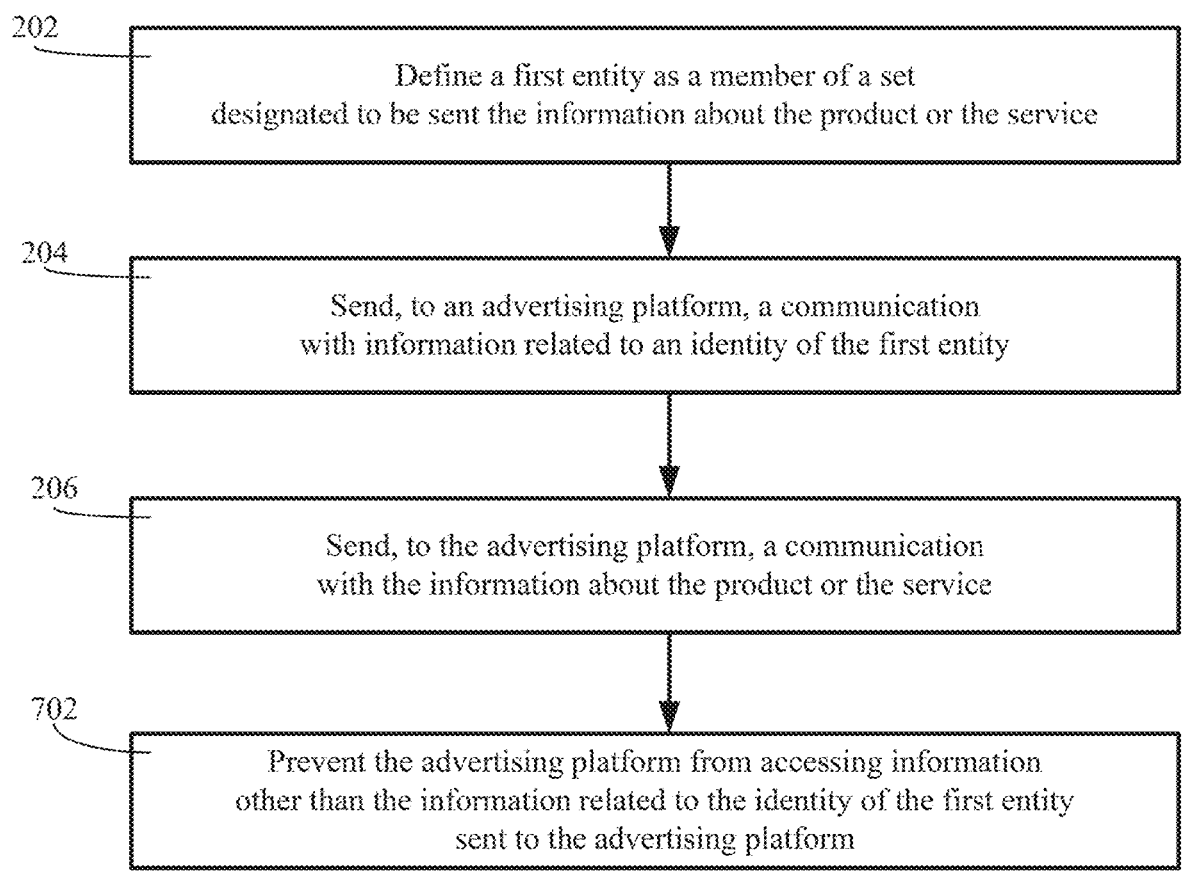
FIG. 7 is a flow diagram illustrating an example of a method for communicating information about a product or a service in which a first entity previously became a subscriber to a second entity.

FIG. 7 is a flow diagram illustrating an example of a method 700 for communicating information about a product or a service in which the first entity (e.g., the potential customer) previously became a subscriber to the second entity (e.g., the marketer). In the method 700, at the operation 202, the first entity can be defined, at the processor, as a member of the set. The set can be designated to be sent the information about the product or the service. The second entity can be associated with the product or the service. At the operation 204, a communication can be sent from the processor to the advertising platform. This communication can include the information related to the identity of the first entity. At the operation 206, a communication can be sent from the processor to the advertising platform. This communication can include the information about the product or the service. At an operation 702, the advertising platform can be prevented from accessing at least the information that indicates that the first entity has executed the agreement to engage in electronic communication with the second entity, electronic commerce with the second entity, or both. For example, although the information related to the identity of the first entity can be sent from the processor to the advertising platform at the operation 204, the advertising platform can be prevented from accessing information other than the information of the communication of the operation 204.

Figure 8:
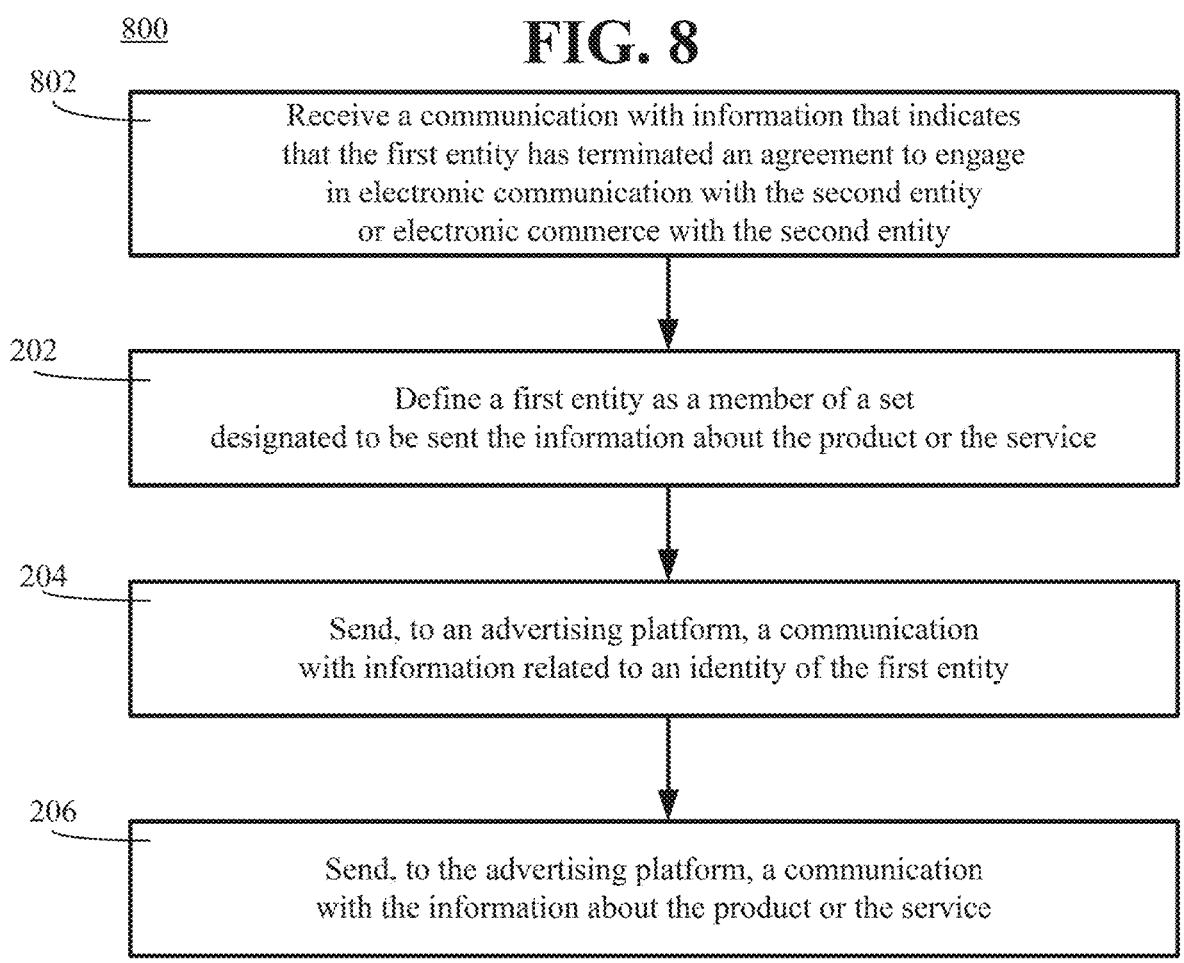
FIG. 8 is a flow diagram illustrating another example of a method for communicating information about a product or a service in which a first entity previously became a subscriber to a second entity.

FIG. 8 is a flow diagram illustrating an example of a method 800 for communicating information about a product or a service in which the first entity (e.g., the potential customer) previously became a subscriber to the second entity (e.g., the marketer). In the method 800, at an operation 802, a communication can be received at the processor. This communication can include information that indicates that the first entity has terminated the agreement to engage in electronic communication with the second entity, electronic commerce with the second entity, or both. For example, the first entity can become an unsubcriber of the second entity. At the operation 202, the first entity can be defined, at the processor, as a member of the set. The set can be designated to be sent the information about the product or the service. The second entity can be associated with the product or the service. At the operation 204, a communication can be sent from the processor to the advertising platform. This communication can include the information related to the identity of the first entity. At the operation 206, a communication can be sent from the processor to the advertising platform. This communication can include the information about the product or the service. In this manner, for example, in a situation in which the first entity has become an unsubscriber of the second entity, the first entity can be designated to be sent the information about the product or the service. For example, the second entity can aspire to reestablish a stronger relationship with the first entity.

Figure 9:
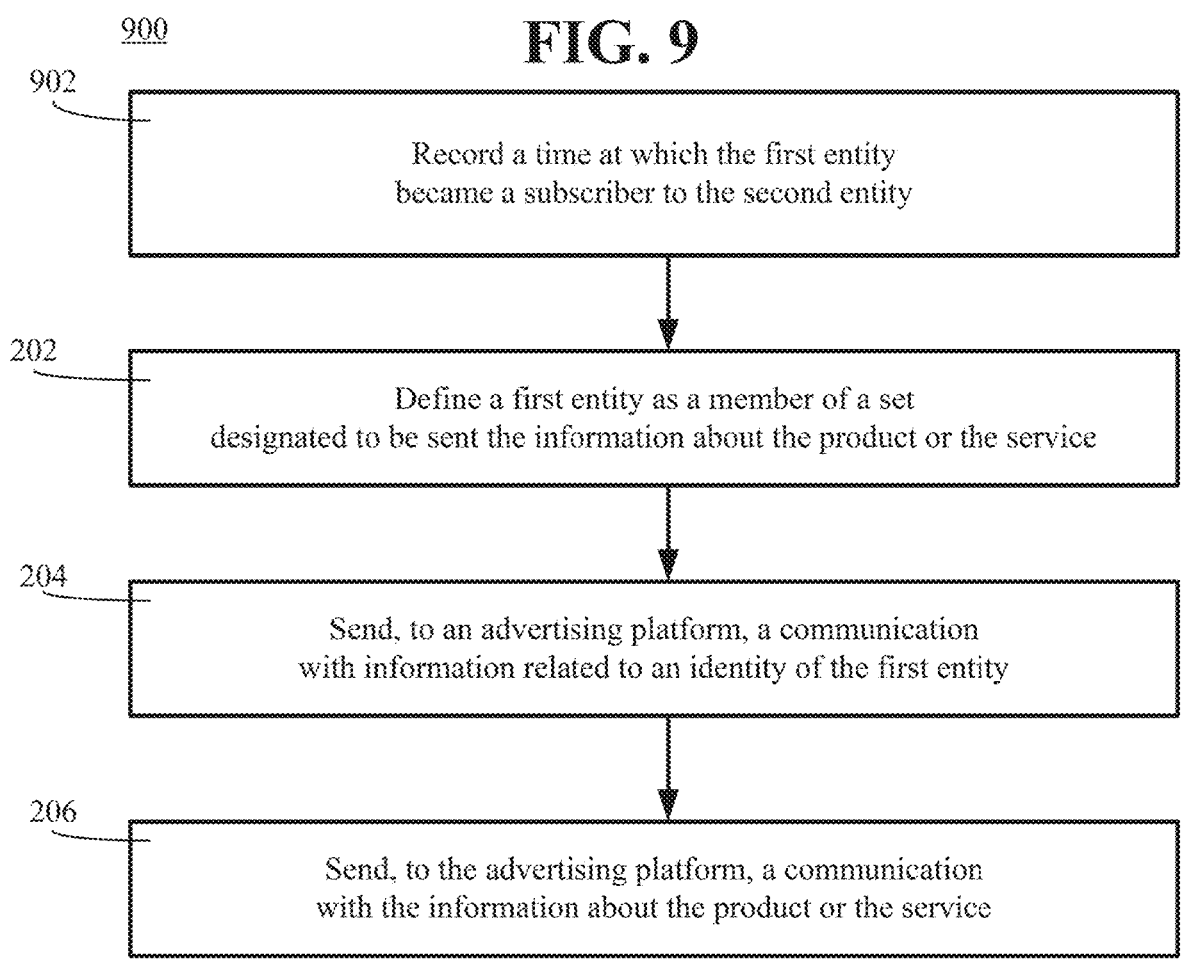
FIG. 9 is a flow diagram illustrating yet another example of a method for communicating information about a product or a service in which a first entity previously became a subscriber to a second entity.

FIG. 9 is a flow diagram illustrating an example of a method 900 for communicating information about a product or a service in which the first entity (e.g., the potential customer) previously became a subscriber to the second entity (e.g., the marketer). In the method 900, at an operation 902, a time at which the first entity became a subscriber to the second entity can be recorded. At the operation 202, the first entity can be defined, at the processor, as a member of the set. The set can be designated to be sent the information about the product or the service. The second entity can be associated with the product or the service. At the operation 204, a communication can be sent from the processor to the advertising platform. This communication can include the information related to the identity of the first entity. At the operation 206, a communication can be sent from the processor to the advertising platform. This communication can include the information about the product or the service. In this implementation, at the operation 202, the set can be defined by determining that a present time is earlier than a sum of a predetermined duration time added to the recorded time. For example, the first entity can be a new subscriber to the second entity. For example, if the first entity became a subscriber to the second entity on Jan. 1, 2015, the predetermined duration of time is 7 days, and the present time is Jan. 5, 2015, then the first entity can be defined as a member of the set. In this manner, for example, in a situation in which the first entity has become a new subscriber to the second entity, the first entity can be designated to be sent the information about the product or the service. For example, the second entity can aspire to establish a strong relationship with the first entity.

Figure 10:
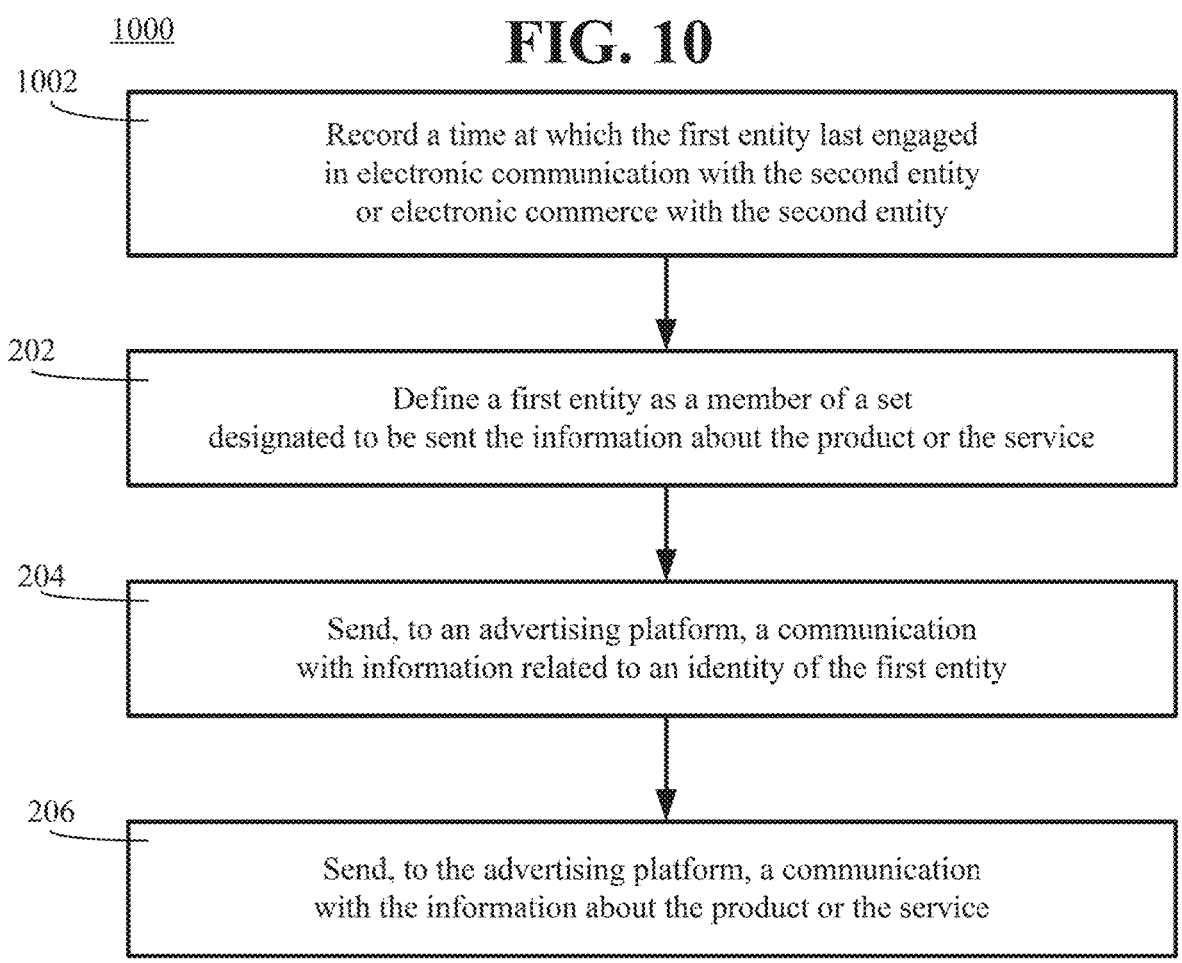
FIG. 10 is a flow diagram illustrating still another example of a method for communicating information about a product or a service in which a first entity previously became a subscriber to a second entity.

FIG. 10 is a flow diagram illustrating an example of a method 1000 for communicating information about a product or a service in which the first entity (e.g., the potential customer) previously became a subscriber to the second entity (e.g., the marketer). In the method 1000, at an operation 1002, a time at which the first entity last engaged in electronic communication with the second entity or electronic commerce with the second entity can be recorded. At the operation 202, the first entity can be defined, at the processor, as a member of the set. The set can be designated to be sent the information about the product or the service. The second entity can be associated with the product or the service. At the operation 204, a communication can be sent from the processor to the advertising platform. This communication can include the information related to the identity of the first entity. At the operation 206, a communication can be sent from the processor to the advertising platform. This communication can include the information about the product or the service. In this implementation, at the operation 202, the set can be defined by determining that a present time is earlier than a sum of a predetermined duration time added to the recorded time. For example, the first entity can be an engaged subscriber of the second entity. For example, if the first entity last engaged in electronic communication with the second entity or electronic commerce with the second entity on Jan. 1, 2015, the predetermined duration of time is 30 days, and the present time is Jan. 5, 2015, then the first entity can be defined as a member of the set. In this manner, for example, in a situation in which the first entity is an engaged subscriber of the second entity, the first entity can be designated to be sent the information about the product or the service. For example, the second entity can aspire to establish a stronger relationship with the first entity.

Figure 11:
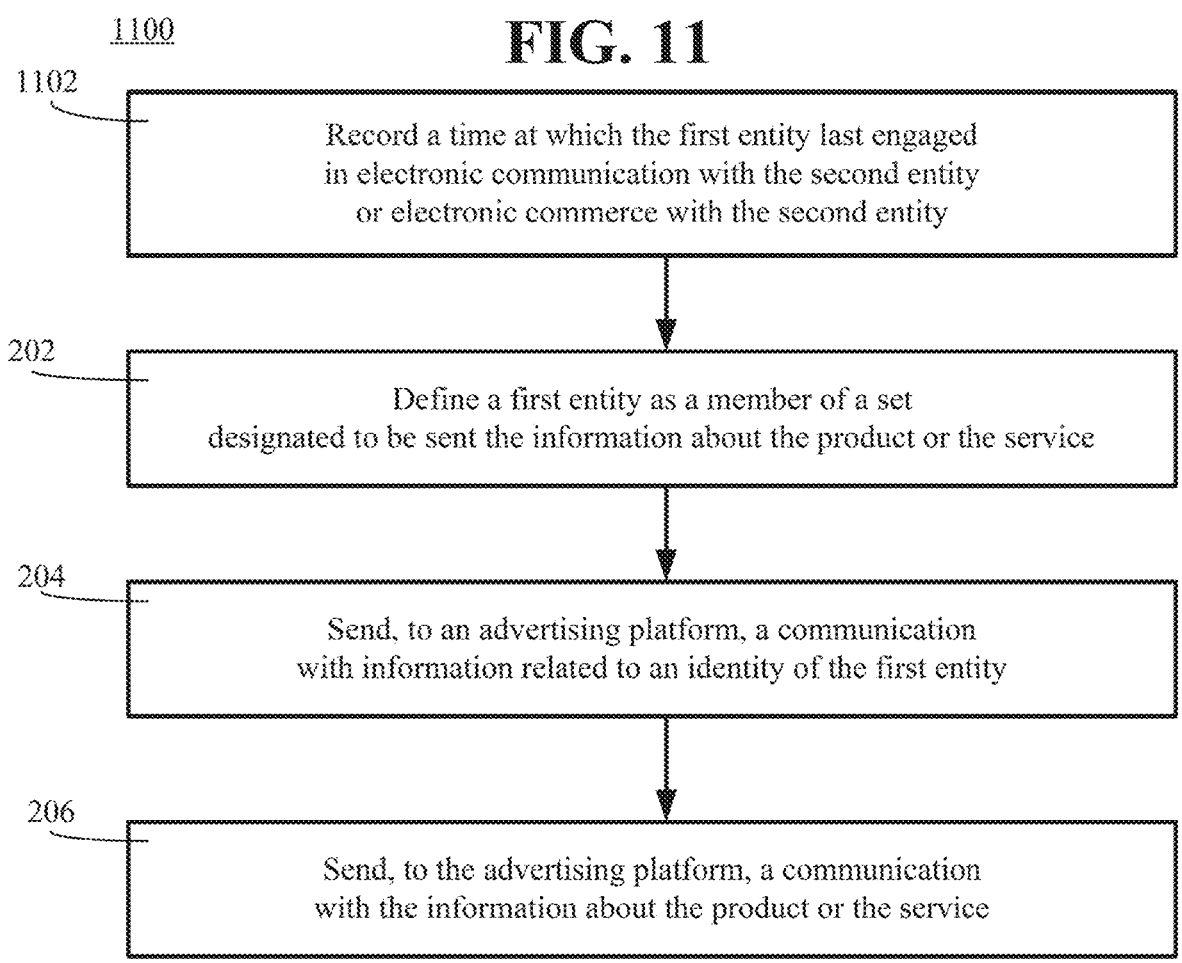
FIG. 11 is a flow diagram illustrating even another example of a method for communicating information about a product or a service in which a first entity previously became a subscriber to a second entity.

FIG. 11 is a flow diagram illustrating an example of a method 1100 for communicating information about a product or a service in which the first entity (e.g., the potential customer) previously became a subscriber to the second entity (e.g., the marketer). In the method 1100, at an operation 1102, a time at which the first entity last engaged in electronic communication with the second entity or electronic commerce with the second entity can be recorded. At the operation 202, the first entity can be defined, at the processor, as a member of the set. The set can be designated to be sent the information about the product or the service. The second entity can be associated with the product or the service. At the operation 204, a communication can be sent from the processor to the advertising platform. This communication can include the information related to the identity of the first entity. At the operation 206, a communication can be sent from the processor to the advertising platform. This communication can include the information about the product or the service. In this implementation, at the operation 202, the set can be defined by determining that a present time is later than a sum of a predetermined duration time added to the recorded time. For example, the first entity can be an unengaged subscriber of the second entity. For example, if the first entity last engaged in electronic communication with the second entity or electronic commerce with the second entity on Jan. 1, 2015, the predetermined duration of time is 1800 days, and the present time is Jul. 5, 2015, then the first entity can be defined as a member of the set. In this manner, for example, in a situation in which the first entity is an unengaged subscriber of the second entity, the first entity can be designated to be sent the information about the product or the service. For example, the second entity can aspire to reestablish a strong relationship with the first entity.

In an implementation, the information about the product or the service can be communicated using any combination of the operations of the methods 200, 300, 400, 500, 700, 800, 900, 1000, and 1100.

Figure 12:
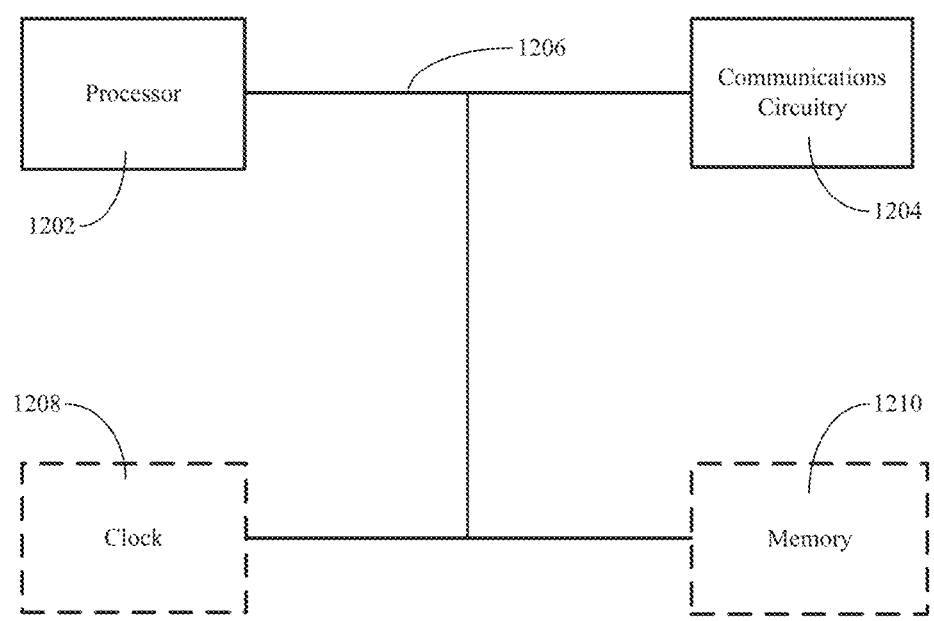
FIG. 12 is a block diagram illustrating an example of a system for communicating information about a product or a service.

FIG. 12 is a block diagram illustrating an example of a system 1200 for communicating information about a product or a service. For example, the system 1200 can be a marketing platform (e.g., the marketing platform 104). System 1200 can include, for example, a processor 1202, communications circuitry 1204, and a bus 1206. The processor 1202 can include any processing circuit operative to control an operation of the system 1200. The communications circuitry 1204 can provide communications between the system 1200 and devices external to the system 1200. The communications circuitry 1204 can be configured to provide communications via a packet switched network, a cellular network, a satellite network, an optical network, a telephone link, the like, or any combination thereof. The communications circuitry 1204 can be configured to provide communications in a wired or a wireless manner. The communications circuitry 1204 can be configured to perform simultaneously several communications operations using different networks. The bus 1206 can be coupled to the processor 1202 and the communications circuitry 1204, and can be configured to facilitated communications among these components. Other devices and components (not illustrated) can be included in the system 1200.

The processor 1202 can be configured to define a first entity as a member of a set. The set can be designated to be sent the information about the product or the service. The first entity can have previously engaged in a communication related to a second entity. The second entity can be associated with the product or the service. The first entity can be, for example, a potential customer (e.g., the potential customer 106). The second entity can be, for example, a marketer (e.g., the marketer 102). The communication related to the second entity, in which the first entity had previously engaged, can have been, by way of example and not by way of limitation, via a postal service, a telephone system (e.g., voice, voicemail, facsimile, cellular, satellite, etc.), an e-mail system, a web page (e.g., an enterprise portal, a web page of a social networking service, etc.), a text messaging system (e.g., a Short Messaging Service (SMS) system, a Multimedia Messaging Service (MMS) system, a social networking service text messaging system, etc.), the like, or any combination thereof. In an implementation, the communication related to the second entity, in which the first entity had previously engaged can have been sent from the first entity to the second entity for a reason other than in response to a communication from the second entity to the first entity.

The set can be defined, for example, from a population of customers and/or potential customers maintained in a CRM system of the marketer. For example, the set can be defined to include members of the population of customers and/or potential customers that are more likely than other members of the population to be positively receptive to the information about the product or the service. Additionally or alternatively, the set can be defined to include members of the population of customers and/or potential customers that are within a market segment defined by the marketer. Additionally or alternatively, the set can be defined by determining that the set includes portions of customers and/or potential customers of the second entity that have a value to the second entity that is greater than a threshold. For example the value of each of the customers and/or potential customers in a CRM system of the second entity can be determined. The set can be defined to include those customers and/or potential customers whose value to the second entity is greater than a threshold dollar amount. Alternatively, the set can be defined to include those customers and/or potential customers whose value to the second entity is greater than a threshold percentile of all of the customers and/or potential customers.

The communications circuitry 1204 can be configured to send, to an advertising platform (e.g. the first or the second advertising platform 108 or 110), a communication that includes information related to an identity of the first entity and a communication that includes the information about the product or the service. The information related to the identity of the first entity can include, for example, an e-mail address, a username, at least a portion of a name, an alias, at least a portion of a government identification number, at least a portion of an employee identification number, at least a portion of a mailing address, at least a portion of a telephone number, at least a portion of a facsimile number, the like, or any combination thereof. In an implementation, the information related to the identity of the first entity can be encrypted. For example, an encrypted form of the information related to the identity of the first entity can be produced from a hash function. The information about the product or the service can be, for example, an advertisement, a promotion, general information, the like, or any combination thereof.

In an implementation, the communications circuitry 1204 can be configured to send the communication that includes the information related to the identity of the first entity and the communication that includes the information about the product or the service concurrently.

In an implementation, the communications circuitry 1204 can be configured to receive a communication that includes information that confirms that the first entity has an account with the advertising platform.

In an implementation, the advertising platform can be a social networking service provider. In this implementation, the communications circuitry 1204 can be configured to send a communication that includes an invitation to establish continual communications between an account for the first entity provided by the social networking service provider and an account for the second entity provided by the social networking service provider. In an aspect, the communications circuitry 1204 can be configured to send the communication that includes the information related to the identity of the first entity and the communication that includes the invitation to establish continual communications between the account for the first entity provided by the social networking service provider and the account for the second entity provided by the social networking service provider concurrently. Additionally, or alternatively, the communications circuitry 1204 can be configured to send the communication that includes the information about the product or the service and the communication that includes the invitation to establish continual communications between the account for the first entity provided by the social networking service provider and the account for the second entity provided by the social networking service provider concurrently.

In an implementation, the communication related to the second entity, in which the first entity had previously engaged, can be between the first entity and the second entity. In this implementation, the processor 1202 can be configured to define the first entity as the member of the set designated to be sent the information about the product or the service by analyzing this communication to determine a pattern of behavior of the first entity. The pattern of behavior can be indicative of a degree of receptiveness of the first entity to the information about the product or the service. For example, this communication can be a plurality of communications between the first entity and the second entity. Such communications can be tracked and analyzed to determine the pattern of behavior. For example, such communications can be tracked and analyzed by a marketing platform such as Journey Builder® provided by salesforce.com of San Francisco, Calif.

In an implementation, the communication related to the second entity, in which the first entity had previously engaged, can be different from a communication between the first entity and the second entity, but this communication can be about the product or the service, a brand associated with the product or the service, the second entity, the like, or any combination thereof. For example, this communication can be a Tweet® posted via Twitter®. The Tweet® communication may not be between the first entity and the second entity, but the Tweet® communication can be about the product or the service, a brand associated with the product or the service, the second entity, the like, or any combination thereof. For example, this communication can be one of several communications. Such communications can be about the product or the service, a brand associated with the product or the service, the second entity, the like, or any combination thereof. Such communications can be tracked to determine if the first entity is a participant. For example, such communications can be tracked by a social media monitoring platform such as Radian6® provided by salesforce.com of San Francisco, Calif.

In an implementation, the communication related to the second entity, in which the first entity had previously engaged, can include the information related to the identity of the first entity. In this implementation, the system 1200 can further include a clock 1208 and a memory 1210. The memory 1210 can include one or more storage media. For example, the memory 1210 can include at least one of a hard-drive, a solid state drive, optical drive, floppy disk, flash memory, read-only memory (ROM), random-access memory (RAM), cache memory, a Fibre Channel network, a storage area network (SAN), or any combination thereof. The bus 1206 can be coupled to the clock 1208 and the memory 1210.

In this implementation, the processor 1202 can be configured to receive, from the clock 1208, a time at which the communication that includes the information about the product or the service (i.e., the first communication) was sent from the communications circuitry 1204, and to record this time in the memory 1210. The first communication can be via a first channel of communication. For example, the first communication can be presented when the first entity is logged into a first account that the first entity has with the advertising platform (e.g., username@email.com). Alternatively, the first communication can be presented when the first entity is logged into an account that the first entity has with a first advertising platform (e.g., email.com). In this implementation, the communications circuit 1204 can be configured to send a communication to the first entity (i.e., the second communication). The second communication can be via a second channel of communication. For example, the second communication can be presented when the first entity is logged into a second account that the first entity has with the advertising platform (e.g., alias@email.com). Alternatively, the second communication can be presented when the first entity is logged into an account that the first entity has with a second advertising platform (e.g., Facebook® or Twitter®). In this implementation, the processor 1202 can be configured to define the set by determining that, since the recorded time, the first entity has been unresponsive to the first communication, and that a present time is later than a sum of a predetermined duration of time added to the recorded time. For example, if the first communication was sent to the first entity on Jan. 1, 2015, to be presented when the first entity is logged into an account that the first entity has with email.com, the predetermined duration of time is 30 days, the first entity has been unresponsive to the first communication, and the present time is Feb. 1, 2015, then the first entity can be defined as a member of the set and the second communication can be sent to be presented when the first entity is logged into an account that the first entity has with Facebook® or Twitter®.

In an implementation, the communication related to the second entity (e.g., the marketer), in which the first entity (e.g., the potential customer) had previously engaged, can include the information related to the identity of the first entity. In this implementation, this communication can also include information that indicates that the first entity has executed an agreement to engage in electronic communication with the second entity, electronic commerce with the second entity, or both. Through such a communication the first entity can become a subscriber to the second entity.

In an aspect of this implementation, the processor 1202 can be configured to prevent the advertising platform from accessing at least the information that indicates that the first entity has executed the agreement to engage in electronic communication with the second entity, electronic commerce with the second entity, or both. For example, although the information related to the identity of the first entity can be sent to the advertising platform, the processor 1202 can be configured to prevent the advertising platform from accessing information other than the information related to the identity of the first entity that was sent to the advertising platform.

In an aspect of this implementation, the communications circuitry 1204 can be configured to receive a communication. This communication can include information that indicates that the first entity has terminated the agreement to engage in electronic communication with the second entity, electronic commerce with the second entity, or both. For example, the first entity can become an unsubcriber of the second entity. The processor 1202 can be configured to define the first entity as a member of the set.

In an aspect of this implementation, the system 1200 can further include the clock 1208 and the memory 1210. In this aspect, the processor 1202 can be configured to receive, from the clock 1208, a time at which the first entity became a subscriber to the second entity, and to record this time in the memory 1210. The processor 1202 can be configured to define the set by determining that a present time is earlier than a sum of a predetermined time added to the recorded time. For example, the first entity can be a new subscriber to the second entity. For example, if the first entity became a subscriber to the second entity on Jan. 1, 2015, the predetermined duration of time is 7 days, and the present time is Jan. 5, 2015, then the first entity can be defined as a member of the set.

In an aspect of this implementation, the system 1200 can further include the clock 1208 and the memory 1210. In this aspect, the processor 1202 can be configured to receive, from the clock 1208, a time at which the first entity last engaged in electronic communication with the second entity or electronic commerce with the second entity, and to record this time in the memory 1210. The processor 1202 can be configured to define the set by determining that a present time is earlier than a sum of a predetermined duration time added to the recorded time. For example, the first entity can be an engaged subscriber of the second entity. For example, if the first entity last engaged in electronic communication with the second entity or electronic commerce with the second entity on Jan. 1, 2015, the predetermined duration of time is 30 days, and the present time is Jan. 5, 2015, then the first entity can be defined as a member of the set.

In an aspect of this implementation, the system 1200 can further include the clock 1208 and the memory 1210. In this aspect, the processor 1202 can be configured to receive, from the clock 1208, a time at which the first entity last engaged in electronic communication with the second entity or electronic commerce with the second entity, and to record this time in the memory 1210. The processor 1202 can be configured to define the set by determining that a present time is later than a sum of a predetermined duration time added to the recorded time. For example, the first entity can be an unengaged subscriber of the second entity. For example, if the first entity last engaged in electronic communication with the second entity or electronic commerce with the second entity on Jan. 1, 2015, the predetermined duration of time is 1800 days, and the present time is Jul. 5, 2015, then the first entity can be defined as a member of the set.

Various implementations for communicating information about a product or a service can include or be implemented in the form of computer-implemented processes and apparatuses for practicing those processes. Implementations also can be implemented in the form of a computer program product having computer program code containing instructions implemented in non-transitory and/or tangible media, such as floppy diskettes, compact disc read-only memories (CD-ROMs), hard drives, universal serial bus (USB) drives, or any other machine readable storage medium, wherein, when the computer program code is loaded into and executed by a computer, the computer becomes an apparatus for practicing implementations for communicating the information about the product or the service.

Implementations also can be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations for communicating information about the product or the service.

When implemented on a general-purpose microprocessor, the computer program code segments configure the microprocessor to create specific logic circuits. In some configurations, a set of computer-readable instructions stored on a computer-readable storage medium can be implemented by a general-purpose processor, which can transform the general-purpose processor or a device containing the general-purpose processor into a special-purpose device configured to implement or carry out the instructions.

Implementations can be implemented using hardware that can include a processor, such as a general-purpose microprocessor and/or an application-specific integrated circuit (ASIC) that implements all or part of the techniques according to implementations of the disclosed subject matter in hardware and/or firmware. The processor can be coupled to memory, such as random-access memory (RAM), read-only memory (ROM), flash memory, a hard disk or any other device capable of storing electronic information. The memory can store instructions adapted to be executed by the processor to perform the techniques for communicating the information about the product or the service.

Figure 13:
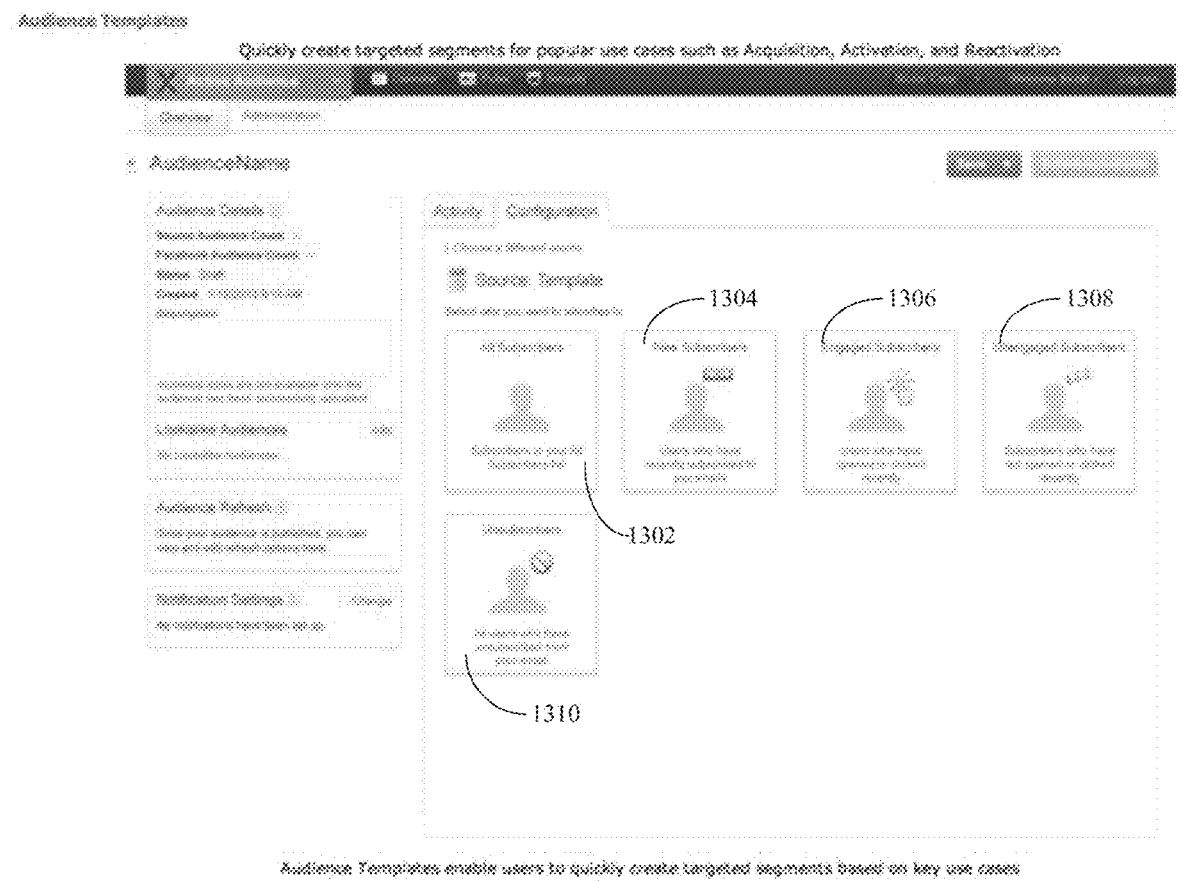
FIG. 13 is a diagram illustrating an example of a web page for sending a communication about a product or a service to a first entity that previously became a subscriber to a second entity.

FIG. 13 is a diagram illustrating an example of a web page 1300 for sending a communication about a product or a service to a first entity that previously became a subscriber to a second entity. For example, the web page 1300 can be provided by a marketer or by a marketing platform to be presented to the marketer. The web page 1300 can include, for example, a first button 1302 for all subscribers, a second button 1304 for new subscribers, a third button 1306 for engaged subscribers, a fourth button 1308 for unengaged subscribers, and a fifth button 1310 for unsubscribers. Each of the buttons can include a corresponding icon to identify the corresponding class of subscribers. The web page 1300 can be a component of a computer-implemented process for communicating the information about the product or the service in which classifications of the subscribers are updated on a continual basis. Each of the buttons can be configured to allow the marketer to initiate a communication, that includes the information about the product or the service, to the corresponding class of subscribers according to the techniques described above. One of skill in the art understands that other graphical control elements rather than the buttons can be used to allow the marketer to initiate the communication, that includes the information about the product or the service, to the corresponding classes of subscribers according to the techniques described above.

Figure 14:
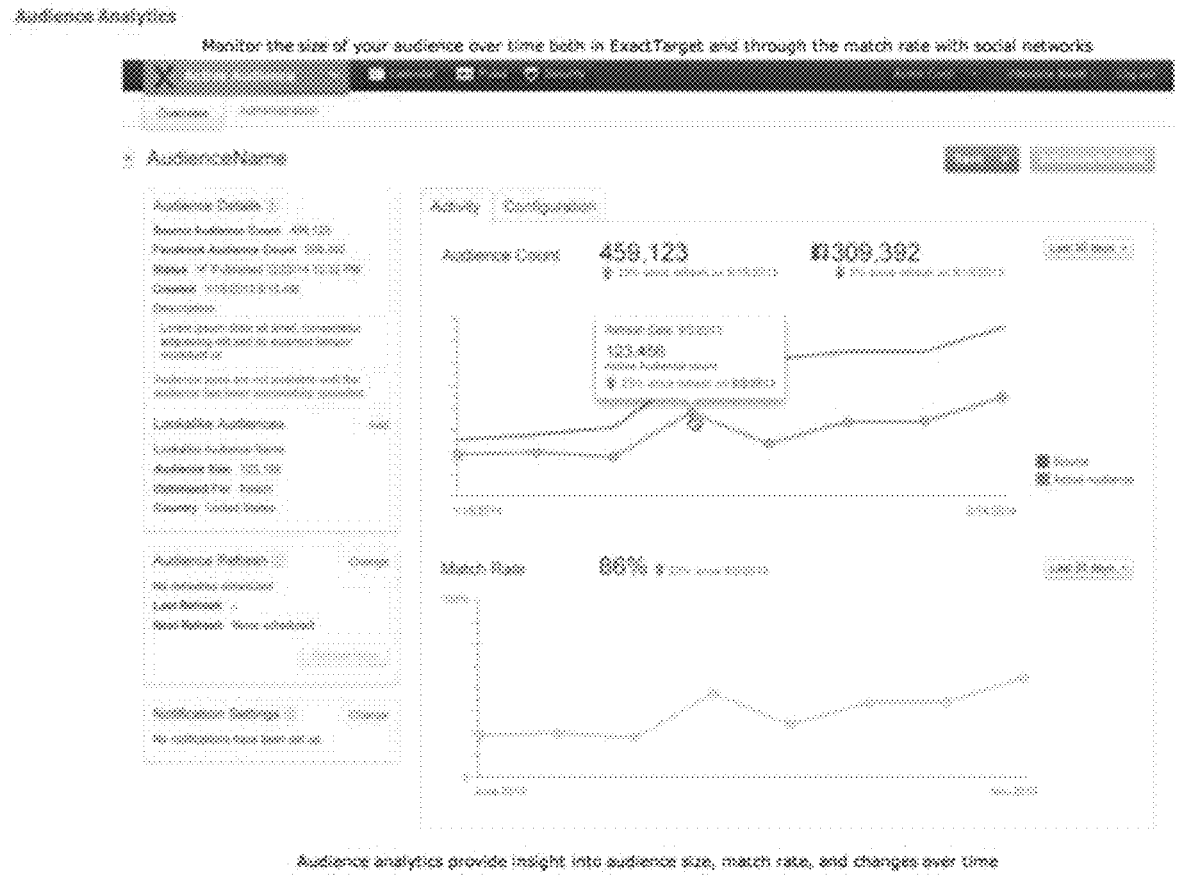
FIG. 14 is a diagram illustrating an example of a web page for presenting, to a second entity, graphs of total counts versus time and match rates versus time for information about potential customers maintained in a customer relationship management system of the second entity and information about the potential customers having accounts with advertising platforms.

FIG. 14 is a diagram illustrating an example of a web page 1400 for presenting, to a second entity, graphs of total counts versus time and match rates versus time for information about potential customers maintained in a customer relationship management system of the second entity and information about the potential customers having accounts with advertising platforms. For example, the web page 1400 can be provided by a marketer or by a marketing platform to be presented to the marketer. The web page 1400 can be used by the marketer to assess a success of an implementation of the techniques described above with respect to communications with the information about the product or the service being sent to first entities.

Figure 15:
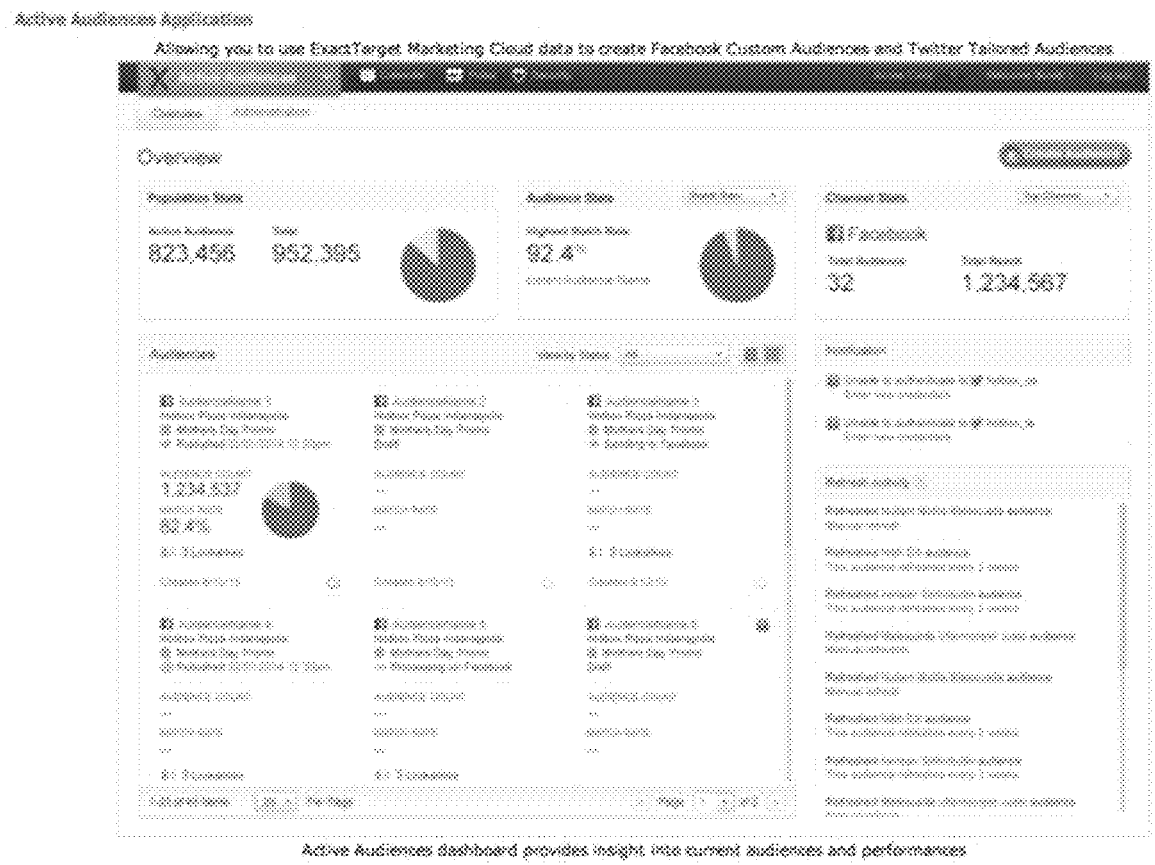
FIG. 15 is a diagram illustrating an example of a web page for presenting, to a second entity, graphs of total counts and match rates for information about potential customers maintained in a customer relationship management system of the second entity and information about the potential customers having accounts with advertising platforms.

FIG. 15 is a diagram illustrating an example of a web page 1500 for presenting, to a second entity, graphs of total counts and match rates for information about potential customers maintained in a customer relationship management system of the second entity and information about the potential customers having accounts with advertising platforms. For example, the web page 1500 can be provided by a marketer or by a marketing platform to be presented to the marketer. The web page 1500 can be used by the marketer to assess a success of an implementation of the techniques described above with respect to communications with the information about the product or the service being sent to first entities.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, thereby to enable others skilled in the art to utilize those implementations as well as various implementations with various modifications as may be suited to the particular use contemplated.

The invention claimed is:

1. A system for producing a web page user interface for communicating information about a product or a service, the system comprising:
a non-transitory memory including processor instructions; and
a processor configured communicate with the memory, wherein the processor instructions when executed by the processor configure the processor to:
determine that a first entity, at a first time, engaged in a first communication with a second entity, the first communication indicating that the first entity executed an agreement to receive electronic communication from the second entity regarding the information about the product or service, the second entity being associated with the product or the service;
define the first entity as a member of a first member set that includes the first entity;
further define the first entity as a member of one of:
a second member set that includes the first entity in response to determining that a present time is earlier than a sum of a first predetermined duration of time added to the first time, the second member set defining a new subscriber member set;
a third member set that includes the first entity in response to determining that, at a second time, the first entity last engaged in the at least one of the electronic communication with the second entity or the electronic commerce with the second entity, the present time being earlier than a sum of a second predetermined duration of time added to the second time, the third member set defining an engaged subscriber member set;
a fourth member set that includes the first entity in response to determining that, at a third time, the first entity last engaged in the at least one of the electronic communication with the second entity or the electronic commerce with the second entity, the present time being later than a sum of a third predetermined duration of time added to the third time, the fourth member set defining an unengaged subscriber member set; or
a fifth member set that includes the first entity in response to determining that, at a fourth time, the first entity terminated the agreement to engage in the at least one of the electronic communication with the second entity or the electronic commerce with the second entity, the fourth time being later than the first time, the fifth member set defining an unsubscribed member set; and
produce the web page user interface that enables communication of the information about the product or the service to each member set by providing a corresponding graphical control element for each of the first, second, third, fourth and fifth member sets configured to be displayed on the web page user interface;
in response to a selection of one of the corresponding graphical control elements associated with a respective member set, sending, by the system, a second communication to a computer-implemented advertising platform,
the second communication including
an address related to an identify of the first entity, wherein the address is not associated with an account the first entity has with the computer-implemented advertising platform, and
the information about the product or the service corresponding to the selection of one of the corresponding graphical control elements associated with the respective member set, and
the second communication configured to be presented to the first entity by the computer-implemented advertising platform at a time when the first entity is logged into the account the first entity has with the computer-implemented advertising platform,
wherein the computer-implemented advertising platform associated with the each corresponding member set being different from the system and being different from a communication device associated with the first entity.

2. The system of claim 1, wherein the processor is configured to define the first entity based upon a content of a record, and
wherein the processor is further configured to:
retrieve, from a computer-implemented database, the record, the record of a communication related to the second entity, the record including information related to an identity of the first entity; and
send, to the computer-implemented advertising platform associated with a third electronic communication, the third electronic communication including the information related to the identity of the first entity.

3. The system of claim 2, wherein the information related to the identity of the first entity comprises at least one of an e-mail address, a username, at least a portion of a name, an alias, at least a portion of a government identification number, at least a portion of an employee identification number, at least a portion of a mailing address, at least a portion of a telephone number, at least a portion of a facsimile number.

4. The system of claim 2, wherein the corresponding graphical control element is further configured to cause the system to send, to the computer-implemented advertising platform associated with the each corresponding member set, the third electronic communication.

5. The system of claim 2, wherein the processor is further configured to receive a fourth electronic communication, the fourth electronic communication confirming that the first entity has an account with the computer-implemented advertising platform associated with the each corresponding member set.

6. The system of claim 2, wherein the computer-implemented advertising platform associated with the each corresponding member set is a computer-implemented social networking service provider.

7. The system of claim 6, wherein the processor is further configured to send a fourth electronic communication, the fourth electronic communication including an invitation to establish continual electronic communications between an account for the first entity provided by the computer-implemented social networking service provider and an account for the second entity provided by the computer-implemented social networking service provider.

8. The system of claim 2, wherein the processor is configured to define the first entity by at least two of:
defining the first entity as the member of the first member set by determining that the first member set includes a portion of customers of the second entity, the portion of the customers having a value to the second entity that is greater than a threshold;
defining the first entity as the member of the second member set by determining that the second member set includes the portion of the customers;
defining the first entity as a member of a third member set by determining that the third member set includes the portion of the customers;
defining the first entity as a member of a fourth member set by determining that the fourth member set includes the portion of the customers; or
defining the first entity as a member of a fifth member set by determining that the fifth member set includes the portion of the customers.

9. The system of claim 2, wherein the first communication was sent from the first entity to the second entity for a reason other than in response to a communication from the second entity to the first entity.

10. The system of claim 2, wherein the first communication is between the first entity and the second entity, and wherein the processor is configured to define the first entity by analyzing the first communication to determine a pattern of behavior of the first entity, the pattern of behavior indicative of a degree of receptiveness of the first entity to the information about the product or the service.

11. The system of claim 2, wherein the first communication is different from a communication between the first entity and the second entity, but the first communication is about at least one of the product or the service, a brand associated with the product or the service, the second entity.

12. The system of claim 2, wherein:
the second communication is via a first channel of communication;
the processor is further configured to:
record a recorded time, the recorded time being a time at which the second communication was sent from the processor; and
send, to the first entity, a fourth electronic communication, the fourth electronic communication being via a second channel of communication; and
the processor is configured to define the first entity by determining that:
since the recorded time the first entity has been unresponsive to the second communication; and
the present time is later than a sum of the predetermined duration of time added to the recorded time.

13. The system of claim 2, wherein:
the processor is further configured to receive a fourth electronic communication, the fourth electronic communication indicating that the first entity has terminated the agreement to engage in the at least one of the electronic communication with the second entity or the electronic commerce with the second entity; and
the processor is configured to define the first entity by determining that the first entity has sent the fourth electronic communication.

14. The system of claim 2, wherein:
the processor is further configured to record a recorded time, the recorded time being a time at which the first communication was received at the processor; and
the processor is configured to define the first entity by determining that the present time is earlier than a sum of a predetermined duration of time added to the recorded time.

15. The system of claim 2, wherein:
the processor is further configured to record a recorded time, the recorded time being a time at which the first entity last engaged in the at least one of the electronic communication with the second entity or the electronic commerce with the second entity; and
the processor is configured to define the first entity by determining that the present time is earlier than a sum of a predetermined duration of time added to the recorded time.

16. The system of claim 2, wherein:
the processor is further configured to record a recorded time, the recorded time being a time at which the first entity last engaged in the at least one of the electronic communication with the second entity or the electronic commerce with the second entity; and
the processor is configured to define the first entity by determining that the present time is later than a sum of a predetermined duration of time added to the recorded time.

17. A method for producing a web page user interface for communicating the information about a product or a service, the method comprising:
providing a non-transitory memory including processor instructions, and a processor configured to communicate with the memory, wherein the processor instructions when executed by the processor cause processor to perform:
determining that a first entity, at a first time, engaged in a first communication with a second entity, the first communication indicating that the first entity executed an agreement to receive electronic communication from the second entity regarding the information about the product or service, the second entity being associated with the product or the service;
defining the first entity as a member of a first member set that includes the first entity;
further defining the first entity as a member of one of:
a second member set that includes the first entity in response to determining that a present time is earlier than a sum of a first predetermined duration of time added to the first time, the second member set defining a new subscriber member set;
a third member set that includes the first entity in response to determining that, at a second time, the first entity last engaged in the at least one of the electronic communication with the second entity or the electronic commerce with the second entity, the present time being earlier than a sum of a second predetermined duration of time added to the second time, the third member set defining an engaged subscriber member set;
a fourth member set that includes the first entity in response to determining that, at a third time, the first entity last engaged in the at least one of the electronic communication with the second entity or the electronic commerce with the second entity, the present time being later than a sum of a third predetermined duration of time added to the third time, the fourth member set defining an unengaged subscriber member set; or a fifth member set that includes the first entity in response to determining that, at a fourth time, the first entity terminated the agreement to engage in the at least one of the electronic communication with the second entity or the electronic commerce with the second entity, the fourth time being later than the first time, the fifth member set defining an unsubscribed member set; and producing the web page user interface that enables communication of the information about the product or the service to each member set by providing a corresponding graphical control element for each of the first, second, third, fourth and fifth member sets configured to be displayed on the web page user interface;

in response to a selection of one of the corresponding graphical control elements associated with a respective member set, sending, by the system, a second communication to a computer-implemented advertising platform, the second communication including
an address related to an identify of the first entity, wherein the address is not associated with an account the first entity has with the computer-implemented advertising platform, and the information about the product or the service corresponding to the selection of one of the corresponding graphical control elements associated with the respective member set, and the second communication configured to be presented to the first entity by the computer-implemented advertising platform at a time when the first entity is logged into the account the first entity has with the computer-implemented advertising platform, wherein the computer-implemented advertising platform associated with the each corresponding member set being different from the processor and being different from a communication device associated with the first entity.

18. The method of claim 17, wherein the producing the web page user interface further comprises at least two of:

a first graphical control element configured to cause the processor to send, to the computer-implemented advertising platform associated with the first member set, a third electronic communication, the third electronic communication including information related to an identity of the first entity;

a second graphical control element configured to cause the processor to send, to the computer-implemented advertising platform associated with the second member set, the third communication;

a third graphical control element configured to cause the processor to send, to the computer-implemented advertising platform associated with the third member set, the third communication;

a fourth graphical control element configured to cause the processor to send, to the computer-implemented advertising platform associated with the fourth member set, the third communication; or a fifth graphical control element configured to cause the processor to send, to the computer-implemented advertising platform associated with the fifth member set, the third communication.

19. A non-transitory computer-readable medium storing computer code for controlling a processor to produce a web page user interface for communicating information about a product or a service, the computer code including instructions to:

determine that a first entity, at a first time, engaged in a first communication with a second entity, the first communication indicating that the first entity executed an agreement to receive electronic communication from the second entity regarding the information about the product or service, the second entity being associated with the product or the service;

define the first entity as a member of a first member set that includes the first entity;

further define the first entity as a member of one of:
a second member set that includes the first entity in response to determining that a present time is earlier than a sum of a first predetermined duration of time added to the first time, the second member set defining a new subscriber member set;

a third member set that includes the first entity in response to determining that, at a second time, the first entity last engaged in the at least one of the electronic communication with the second entity or the electronic commerce with the second entity, the present time being earlier than a sum of a second predetermined duration of time added to the second time, the third member set defining an engaged subscriber member set;

a fourth member set that includes the first entity in response to determining that, at a third time, the first entity last engaged in the at least one of the electronic communication with the second entity or the electronic commerce with the second entity, the present time being later than a sum of a third predetermined duration of time added to the third time, the fourth member set defining an unengaged subscriber member set; or a fifth member set that includes the first entity in response to determining that, at a fourth time, the first entity terminated the agreement to engage in the at least one of the electronic communication with the second entity or the electronic commerce with the second entity, the fourth time being later than the first time, the fifth member set defining an unsubscribed member set; and produce the web page user interface that enables communication of the information about the product or the service to each member set by providing a corresponding graphical control element for each of the first, second, third, fourth and fifth member sets configured to be displayed on the web page user interface;

in response to a selection of one of the corresponding graphical control elements associated with a respective member set, sending, by the system, a second communication to a computer-implemented advertising platform, the second communication including
an address related to an identify of the first entity, wherein the address is not associated with an account the first entity has with the computer-implemented advertising platform, and the information about the product or the service corresponding to the selection of one of the corresponding graphical control elements associated with the respective member set, and the second communication configured to be presented to the first entity by the computer-implemented advertising platform at a time when the first entity is logged into the account the first entity has with the computer-implemented advertising platform, wherein the computer-implemented advertising platform associated with the each corresponding member set being different from the processor and being different from a communication device associated with the first entity.

* * * * *